(12) United States Patent
Eichhorn

(10) Patent No.: US 11,193,580 B2
(45) Date of Patent: Dec. 7, 2021

(54) CONTROL ELEMENT FOR A VEHICLE

(71) Applicant: Bayerische Motoren Werke Aktiengesellschaft, Munich (DE)

(72) Inventor: Julian Eichhorn, Menlo Park, CA (US)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 155 days.

(21) Appl. No.: 16/702,718

(22) Filed: Dec. 4, 2019

(65) Prior Publication Data
US 2020/0103021 A1    Apr. 2, 2020

Related U.S. Application Data

(63) Continuation of application No. PCT/EP2018/064164, filed on May 30, 2018.

(30) Foreign Application Priority Data

Jun. 29, 2017   (DE) .................. 10 2017 211 062.7

(51) Int. Cl.
*F16H 59/10* (2006.01)
*B60K 20/02* (2006.01)
(Continued)

(52) U.S. Cl.
CPC .......... *F16H 59/105* (2013.01); *B60K 20/02* (2013.01); *B60K 26/02* (2013.01); *B60K 35/00* (2013.01); *F16H 59/044* (2013.01); *F16H 59/12* (2013.01); *F16H 63/48* (2013.01); *F16H 63/50* (2013.01); *G05G 1/04* (2013.01); *G05G 1/08* (2013.01); *G05G 5/005* (2013.01); *G06F 3/041* (2013.01);
(Continued)

(58) Field of Classification Search
CPC .. F16H 59/02; F16H 59/0204; F16H 59/0278; F16H 59/08; F16H 59/10; F16H 59/105; F16H 59/04; F16H 2059/0221; F16H 2059/0247; F16H 2059/081; B60Q 1/1469
See application file for complete search history.

(56) References Cited

U.S. PATENT DOCUMENTS

2003/0172762 A1    9/2003   Ehrmaier et al.
2005/0034557 A1*   2/2005   Anderbrugge ......... H01H 25/06
                                                      74/553
(Continued)

FOREIGN PATENT DOCUMENTS

CN    102947147 A    2/2013
CN    104896080 A    9/2015
(Continued)

OTHER PUBLICATIONS

Machine Translation of DE 10 2016 206 579.*
(Continued)

*Primary Examiner* — Richard W Ridley
*Assistant Examiner* — Brian J McGovern
(74) *Attorney, Agent, or Firm* — Crowell & Moring LLP

(57) ABSTRACT

A control element for a vehicle is designed to change between a parking state and a driving state. In the parked state, the control element is designed to enable a driver to switch the vehicle from a parked state to a travel state. The control element also enables the vehicle driver to freely select a gear of the vehicle by changing from a parking state into a drive state.

13 Claims, 13 Drawing Sheets

(51) Int. Cl.
  *B60K 26/02* (2006.01)
  *B60K 35/00* (2006.01)
  *F16H 59/04* (2006.01)
  *F16H 59/12* (2006.01)
  *F16H 63/48* (2006.01)
  *F16H 63/50* (2006.01)
  *G05G 1/04* (2006.01)
  *G05G 1/08* (2006.01)
  *G05G 5/00* (2006.01)
  *G06F 3/041* (2006.01)

(52) U.S. Cl.
  CPC . *B60K 2370/111* (2019.05); *B60K 2370/1442* (2019.05); *G05G 2505/00* (2013.01)

(56) References Cited

U.S. PATENT DOCUMENTS

| | | | |
|---|---|---|---|
| 2013/0186226 A1 | 7/2013 | Tovar et al. | |
| 2014/0149909 A1 | 5/2014 | Montes | |
| 2014/0157930 A1 | 6/2014 | Schneider et al. | |
| 2015/0053038 A1* | 2/2015 | Kim | F16H 59/10 74/473.3 |
| 2015/0251534 A1 | 9/2015 | Kim | |
| 2016/0185351 A1* | 6/2016 | Jerger | F16H 61/0204 701/56 |
| 2018/0244155 A1* | 8/2018 | Keenan | F16H 59/08 |
| 2018/0244182 A1* | 8/2018 | Keenan | F16H 59/105 |
| 2018/0292002 A1 | 10/2018 | Helot et al. | |

FOREIGN PATENT DOCUMENTS

| | | | |
|---|---|---|---|
| DE | 199 37 054 A1 | 2/2000 | |
| DE | 10 2007 037 706 A1 | 2/2009 | |
| DE | 10 2009 001 376 A1 | 9/2010 | |
| DE | 102 06 985 B4 | 7/2012 | |
| DE | 10 2011 084 557 A1 | 4/2013 | |
| DE | 10 2012 020 715 B3 | 4/2014 | |
| DE | 10 2013 221 895 A1 | 5/2014 | |
| DE | 10 2012 112 144 A1 | 6/2014 | |
| DE | 10 2013 204 793 A1 | 9/2014 | |
| DE | 10 2015 010 026 A1 | 2/2017 | |
| DE | 102016206579 A1 * | 10/2017 | ........... B60R 25/252 |
| EP | 1 146 257 A2 | 10/2001 | |
| EP | 1 146 257 B1 | 3/2006 | |
| JP | 2006177401 A * | 7/2006 | ............. B60K 37/06 |
| JP | 2008044540 A * | 2/2008 | ............. B60K 37/06 |
| JP | 2011-218851 A | 11/2011 | |
| WO | WO 2016/042949 A1 | 3/2016 | |
| WO | WO 2017/001006 A1 | 1/2017 | |

OTHER PUBLICATIONS

Machine Traslation of JP 2008-044540.*
Machine Translation of JP 2006-177401.*
Machine Translation of DE 10 2009 001 376.*
Chinese-language Office Action issued in Chinese Application No. 201880034917.X dated Feb. 10, 2021 with partial English translation (13 pages).
Chinese-language Office Action issued in Chinese Application No. 201880034917.X dated Aug. 13, 2020 with English translation (nine (9) pages).
International Search Report (PCT/ISA/210) issued in PCT Application No. PCT/EP2018/064164 dated Feb. 4, 2019 with English translation (seven (7) pages).
German-language Written Opinion (PCT/ISA/237) issued in PCT Application No. PCT/EP2018/064164 dated Feb. 4, 2019 (10 pages).
German-language Office Action issued in counterpart German Application No. 10 2017 211 062.7 dated Mar. 20, 2018 (10 pages).

* cited by examiner

CONTROL ELEMENT FOR A VEHICLE

CROSS REFERENCE TO RELATED APPLICATIONS

This application is a continuation of PCT International Application No. PCT/EP2018/064164, filed May 30, 2018, which claims priority under 35 U.S.C. § 119 from German Patent Application No. 10 2017 211 062.7, filed on Jun. 29, 2017, the entire disclosures of which are herein expressly incorporated by reference.

BACKGROUND AND SUMMARY OF THE INVENTION

The invention relates to a control element for a vehicle, in particular for providing a vehicle's readiness for driving.

A vehicle typically comprises a start-stop control element (typically a pushbutton) for starting and stopping a drive motor of the vehicle. Furthermore, a vehicle can comprise a mechanical or electrical parking brake with a dedicated control element, said parking brake making it possible to block one or more of the wheels of the vehicle for parking of the vehicle. Moreover, a vehicle having an automatic transmission can comprise a gear selector lever, which can be used by a driver to set different gear stages (e.g. forward (D), reverse (R), transmission lock (P) or neutral (N)).

A vehicle thus typically comprises a multiplicity of different control elements that have to be actuated before a journey or after a journey. The present document addresses the technical problem of providing a control element for a vehicle which makes it possible to increase the control convenience for a user at the beginning of a journey and/or at the end of a journey with the vehicle.

The problem is solved by means of the independent claim. Advantageous embodiments are described inter alia in the dependent claims. It is pointed out that additional features of a patent claim dependent on an independent patent claim without the features of the independent patent claim or only in combination with a subset of features of the independent patent claim can form a dedicated invention which is independent of the combination of all features of the independent patent claim and which can be made the subject of an independent claim, of a divisional application or of a subsequent application. This applies in the same way to technical teachings which are described in the description and which can form an invention that is independent of the features of the independent patent claims.

In accordance with one aspect, a control element for a vehicle (in particular for a road motor vehicle) is described. The control element can be arranged in the vehicle in such a way that a driver positioned at a driver's position in the vehicle can actuate the control element with one hand. By way of example, the control element can be arranged on or in the vicinity of a steering device, in particular a steering wheel, or on a center console of the vehicle.

The control element is configured to change between a park state and a driving state. In this case, the control element can be configured, in the park state and in the driving state, to enable at least partly different inputs for controlling a transmission, a parking brake, a drive motor (e.g. an electric drive motor) of the vehicle and/or the actuation electronics of the drive motor. A control element can thus be provided which enables inputs differently depending on whether the control element is in a park state or in a driving state. In this case, the control element can be in a park state when the vehicle (in which the control element is arranged) is in a parking or parked state. On the other hand, the control element can be in the driving state when the vehicle is in a ready-for-driving state. The one or more inputs which can be effected with the control element can thus be dependent on whether the control element is in the park state or in the driving state or whether the vehicle is in the parked state or in the ready-for-driving state.

The drive motor and/or the actuation electronics for the drive motor can be part of a drive unit comprising e.g. an electric drive motor and/or an internal combustion engine. By way of example, a hybrid drive unit can comprise both an electric drive motor and an internal combustion engine. The drive unit can comprise an on-board electrical system having a (high-voltage) energy store for storing electrical energy for an electric drive motor. The control element can thus be configured to enable one or more inputs in relation to a drive unit of the vehicle.

In the parked state of the vehicle, e.g. the transmission lock of the transmission of the vehicle can be closed (which can typically be achieved nowadays by engaging the gear stage P by way of a transmission lever). Furthermore, in the parked state of the vehicle, the (electrical) parking brake of the vehicle can be engaged (e.g. in order to block at least one wheel of the vehicle). If appropriate, the parking brake can be engaged depending on environment data concerning a direct environment of the vehicle. The environment data can be detected by one or more environment sensors of the vehicle. The environment data can indicate e.g. the gradient of the roadway, the ground coefficient of friction of the roadway, the air humidity and/or the temperature of the environment of the vehicle. A decision can then be taken once or cyclically or repeatedly regarding whether the parking brake is engaged or is released in the parked state of the vehicle.

In addition, in the parked state of the vehicle, the drive motor and/or the actuation electronics of the drive motor can be inactive. By way of example, an internal combustion engine can be deactivated. Alternatively or supplementarily, the energy store for storing the electrical energy for the operation of an electric drive motor can be decoupled from an inverter of the electric drive motor.

On the other hand, in the ready-for-driving state of the vehicle, the transmission lock of the transmission of the vehicle can be open. In particular, in the ready-for-driving state, the gear stage R, N or D can be engaged. In addition, in the ready-for-driving state, the drive motor and/or the actuation electronics of the drive motor can be active. By way of example, an internal combustion engine can be active. Alternatively or supplementarily, the energy store for storing the electrical energy for the operation of an electric drive motor can be coupled to the inverter of the electric drive motor.

The control element in the park state is configured to enable a user to switch the vehicle from the parked state to the ready-for-driving state. In this case, preferably, a single actuation of the control element can be sufficient to switch the vehicle from the parked state to the ready-for-driving state. It is then possible automatically to instigate a situation in which the transmission lock of the transmission is opened and the drive motor and/or the actuation electronics of the drive motor are/is activated. The parking brake can still remain engaged, if appropriate, in order to prevent the vehicle from rolling away. The parking brake can be automatically released, if appropriate, if the user of the vehicle activates an accelerator pedal of the vehicle in order to accelerate the vehicle.

The control element, as a result of a change from the park state to the driving state, can enable the possibility for the selection of a gear stage (in particular of a transmission) of the vehicle by a user of the vehicle. In other words, owing to the transition from the park state to the driving state of the control element, the control element can enable the selection of a gear stage of the vehicle (in particular of a gear stage N, D or R). On the other hand, the control element can be configured in such a way that no selection of the gear stage is enabled in the park state.

The gear stages that are selectable in the driving state of the control element can be restricted to one gear stage N, one or more gear stages for driving forward (D) and/or one or more gear stages for driving in reverse (R). A dedicated selection of the gear stage P for activating the transmission lock cannot be enabled if appropriate (with the control element remaining in the driving state).

A (single, coherent) control element is thus described which can be switched to different states (in particular to a park state and to a driving state) in order to provide a differently bounded set of possible inputs depending on the state of the vehicle. In this case, the control element can distinguish in particular exclusively between the park state and the driving state, i.e. between the parked state and the ready-for-driving state of the vehicle. In this regard, the control convenience for a user of a vehicle can be increased.

It should be noted that, even without a transmission, different gear stages can be provided in a vehicle. By way of example, an (electric) drive motor can provide two different rotational directions for driving forward (with the gear stage D) and driving in reverse (with the gear stage R). The control element can be configured to enable the change between these gear stages in the driving state, such that the drive motor is caused to change its rotational direction. The change in the rotational direction of an (electric) drive motor can be brought about e.g. by an adaptation of the actuation electronics of the drive motor.

The control element in the park state can be configured exclusively to detect an input for switching the vehicle from the parked state to the ready-for-driving state. In other words, the control element in the park state can be restricted to a single input, wherein the single input brings about an automatic change of the vehicle from the parked state to the ready-for-driving state (without a further input being required for this purpose). If appropriate, for reasons of safety or the possibility of incorrect operation (if appropriate under specific conditions), the simultaneous actuation of an UNLOCK button or a brake pedal of the vehicle may be necessary in order to bring about the automatic change of the vehicle from the parked state to the ready-for-driving state.

In particular, the control element in the park state can enable no input regarding a change of the gear stage (in particular of the transmission) of the vehicle. Furthermore, the control element can be designed in such a way that no input which is directed solely to releasing the transmission lock of the transmission of the vehicle is enabled in the park state. In this regard, particularly high control convenience can be enabled since all required measures for switching the vehicle to a ready-for-driving state are implemented automatically in reaction to a single actuation of the control element.

The control element in the driving state can be configured to detect an input for switching the vehicle from the ready-for-driving state to the parked state. Once again a single actuation of the control element can be sufficient here for switching the vehicle from the (fully) ready-for-driving state to the (fully) parked state. On the other hand, the control element can be configured to enable no input which is directed exclusively to activating the transmission lock of the transmission (without deactivating the drive motor and/or the actuation electronics of the drive motor and, if appropriate, without engaging the parking brake). Furthermore, the control element can be configured to enable no input which is directed exclusively to stopping the drive motor and/or the actuation electronics of the drive motor of the vehicle (without activating the transmission lock of the transmission and/or without engaging the parking brake).

In the driving state the control element can thus be limited to changing gear stages of the vehicle (if appropriate limited to the gear stages N, D and R or limited to the gear stages D and R) and to switching the vehicle from the ready-for-driving state to the parked state. If appropriate, a change of a driving mode of the vehicle (e.g. of a sport mode or of an eco mode or of a configuration of a hybrid drive strategy) can optionally be brought about in the driving state. Further input possibilities can be excluded in the driving state. In this regard, the control convenience can be increased further. In particular, incorrect inputs can thus be avoided.

The control element can comprise a touch-sensitive screen (e.g. on the surface of a control body of the control element). The screen can comprise a pixel matrix in order to represent different symbols or graphical elements on the basis of the individual pixels. Alternatively or supplementarily, the screen can comprise different graphical segments (for different control segments). The screen can be configured to display different symbols in different segments. Furthermore, the screen can be configured to detect the touching of a segment or of a symbol by a user of the vehicle.

In particular, the control element, preferably the touch-sensitive screen, can be secured against unintentional actuation. By way of example, the control element can be configured to detect a touch as actuation if the touch has a predetermined minimum duration and/or a predetermined minimum pressure. Alternatively or additionally, the actuation can be detected by means of a pressure sensor, for example by means of a pressure switch or a pressure-sensitive display element. Furthermore, additionally or alternatively, provision can be made of further or other sensors for detecting an actuation, for example capacitive sensors, optical sensors, and/or piezoelements. Within this description, "touching" a control element, for example, should be understood as "actuating".

The screen can be configured, in the park state of the control element and/or when the vehicle is in the parked state, to display a start control segment (e.g. with a corresponding symbol), wherein the start control segment enables a user to switch the vehicle from the parked state to the ready-for-driving state by actuating the start control segment. Preferably, the start control segment can be the sole control segment which is displayed to a user in the park state of the control element and/or is provided for the control. In this regard, the control convenience can be increased.

Furthermore, the screen can be configured, in the driving state of the control element and/or when the vehicle is in the ready-for-driving state, to display and/or to provide a gear stage control segment, which enables a user to set different gear stages (if appropriate, limited to the gear stages N, D and R) of the vehicle by actuating the gear stage control segment.

The start control segment cannot be provided in the driving state. On the other hand, the screen can be configured, in the driving state of the control element, to display a park control segment (if appropriate at the same location as the start control segment), which enables a user to switch the vehicle, in particular proceeding from an arbitrary gear stage (e.g. N, D or R) of the vehicle, from the ready-for-driving state to the parked state by actuating the park control segment. In this regard, in order to end a journey in a convenient manner (i.e. with a minimal number of control steps), the vehicle can be put into the parked state. In particular, switching from the ready-for-driving state to the parked state can be brought about by means of a single actuation of the park control segment.

The control element can comprise a control body, which can be moved out from a surface of the vehicle (e.g. from a center console of the vehicle) and back again. In a retracted state, a surface of the control body can be substantially flush with the surface of the vehicle. On the other hand, in an extended state, the control body can project (e.g. by 2 cm, 5 cm or more) beyond the surface of the vehicle. The surface of the control body can comprise a touch-sensitive screen, e.g. in order to provide a start control segment or a park control segment, and/or in order to display the different gear stages (in particular of the transmission) of the vehicle (depending on the state of the control element).

The control body of the control element can be moved out from the surface of the vehicle (i.e. be moved to the extended state) for the change from the park state to the driving state. On the other hand, the control body of the control element can be moved back to the surface of the vehicle (i.e. be moved to the retracted state) for the change from the driving state to the park state. In the retracted state of the control body, the control element, if appropriate, can only enable the switching of the vehicle from the parked state to the ready-for-driving state (e.g. by way of a start control segment provided on the surface of the control body).

On the other hand, in the extended state of the control body, the control element can enable the selection of a gear stage. In particular, the control body in the extended state can be arranged in movable fashion (e.g. monostably or multistably). The control element can then be configured to enable a user of the vehicle to change the gear stage (in particular of the transmission) of the vehicle by moving the control body. In this case, the gear stages that are selectable via the control body can be restricted to one gear stage N, to one or more gear stages for driving forward and to one or more gear stages for driving in reverse. In particular, it is possible for the control element not to enable the selection of the park stage P (for locking the transmission lock).

Furthermore, in the extended state of the control body, the control element can enable the switching of the vehicle from the ready-for-driving state to the parked state (e.g. by way of a park control segment provided on the surface of the control body).

The park state and the driving state of the control element can thus be provided by means of a control body, wherein the control body is in the retracted state in the park state of the control element and in the extended state in the driving state of the control element. The use of an extendible control body makes it possible to distinguish the different states of the control element in a reliable manner, in particular optically and haptically.

The control element can comprise a control part, which can be moved, in particular rotated and/or moved in a translational direction, relative to a base part of the control element. The base part can be e.g. a lever arranged on a steering wheel. The base part can comprise different areas, in particular a park state area and a driving state area. By way of example, the base part can be configured as a parallelepiped and the park state area and the driving state area can be arranged on different sides of the parallelepiped.

The control part can be configured to be rotated from the park state area to the driving state area by a user in order to switch the vehicle from the parked state to the ready-for-driving state. In particular, a marking on the control part can be rotated from the park state area to the driving state area. The rotation can be, if appropriate, the sole movement possibility for the control part if the control part (in particular the marking of the control part) faces the park state area and the control element is thus in the park state. In particular, no translational movement of the control part can be enabled in the park state of the control element.

Furthermore, the control part can be configured to be displaced (in a translational movement) along the driving state area by a user in order to change the gear stage (in particular of the transmission) of the vehicle. The control element can be in the driving state if the control element (in particular the marking of the control element), faces the driving state area.

The control part can furthermore be configured to be rotated from the driving state area to the park state area by a user, in particular proceeding from an arbitrary gear stage of the vehicle (and thus proceeding from an arbitrary one of the possible displacements of the control part) in order to switch the vehicle from the ready-for-driving state to the parked state.

By providing a control part that enables different movements (rotation and/or translational movement) in different states of the control element, it is possible to provide a control element having high control convenience.

The control element can comprise a control unit configured to generate a control signal for the drive motor, for the actuation electronics of the drive motor, for the transmission and/or for the parking brake of the vehicle depending on an input by a user at the control element. In particular, control signals can be generated for switching the vehicle from the parked state to the ready-for-driving state (or vice versa) or for changing a gear stage.

As already set out above, the transmission lock of the transmission is typically closed in the parked state of the vehicle. The control unit of the control element can be configured to generate a control signal for opening the transmission lock of the transmission in reaction to a user input at the control element which is designed to switch the vehicle from the parked state to the ready-for-driving state. The vehicle can then (without a further input by the user) be provided in the gear stage N or D.

The control unit can be configured to switch the control element from the park state to the driving state (or vice versa) as soon as the vehicle has been switched from the parked state to the ready-for-driving state (or vice versa). It is thus possible to ensure that the control element in the park state is available to the user of the vehicle when the vehicle is in the parked state, and that the control element in the driving state is available to the user of the vehicle when the vehicle is in the ready-for-driving state.

In accordance with a further aspect, a description is given of a road motor vehicle (in particular an automobile or a truck or a bus) comprising the control element described in this document. Furthermore, the vehicle can comprise a drive motor (in particular an electric drive motor) for driving one or more wheels of the vehicle. Moreover, the vehicle can comprise an (if appropriate automatic) transmission configured to vary a coupling between the drive motor and the one or more wheels.

It should be noted that the methods, devices and systems described in this document can be used both by themselves and in combination with other methods, devices and systems described in this document. Furthermore, any aspects of the methods, devices and systems described in this document can be combined with one another in diverse ways. In particular, the features of the claims can be combined with one another in diverse ways.

Other objects, advantages and novel features of the present invention will become apparent from the following detailed description of one or more preferred embodiments when considered in conjunction with the accompanying drawings.

DETAILED DESCRIPTION OF THE DRAWINGS

As set out in the introduction, the present document is concerned with increasing the control convenience of a vehicle, in particular when switching the vehicle to a ready-for-driving state and/or when switching the vehicle to a park state.

Nowadays a vehicle typically comprises an ignition lock or a start-stop button in order to start the internal combustion engine of the vehicle or in order to activate the ignition of the internal combustion engine. If a vehicle does not comprise an internal combustion engine (but rather only an electric motor) and/or if a vehicle comprises an automatic motor start-stop mechanism then the need to start or stop the drive motor of the vehicle is typically obviated.

Furthermore, a vehicle can comprise an (electrical) parking brake and/or a transmission lock which may need to be manually released before the beginning of a journey or engaged for parking by way of a dedicated control element. Moreover, there may be a lack of clarity regarding the state of the parking brake and/or the transmission lock.

Figure 1:
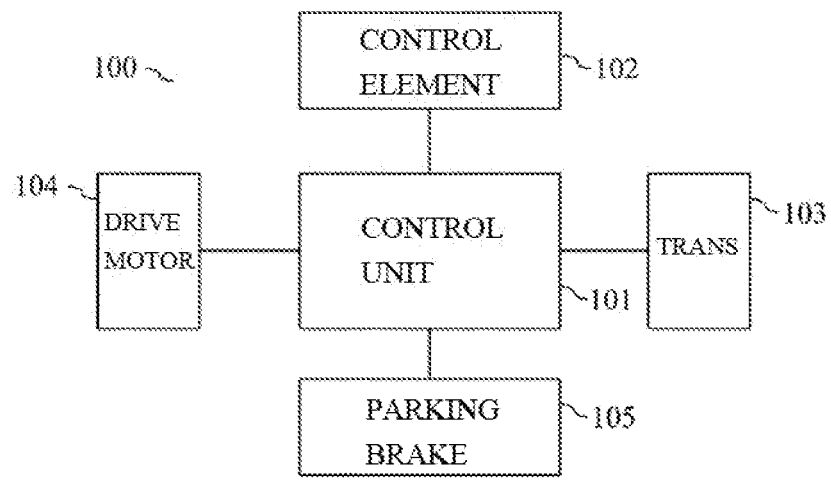
FIG. 1 shows exemplary components of a vehicle.

FIG. 1 shows exemplary components of a vehicle 100. In particular, FIG. 1 shows a control element 102, which enables a user of the vehicle 100 to effect an input in order to put the vehicle 100 into a ready-for-driving state or in order to put the vehicle 100 into a parked state from a ready-for-driving state. Furthermore, the vehicle 100 comprises an (automatic) transmission 103, a drive motor 104 and a parking brake 105.

The control element 102 can transmit a control signal dependent on a user input to a control unit 101 of the vehicle 100. If appropriate, the control element 102 can comprise the control unit 101. The control unit 101 can then be configured to actuate the transmission 103, the drive motor 104 and/or the parking brake 105 depending on the control signal.

Furthermore, the control unit 101 can be configured to determine a state of the vehicle 100. By way of example, it is possible to determine whether the vehicle 100 is in a ready-for-driving state or in a parked state. The control unit 101 can then adapt the one or more inputs detectable by way of the control element 102 depending on the state of the vehicle 100.

Figure 2A:
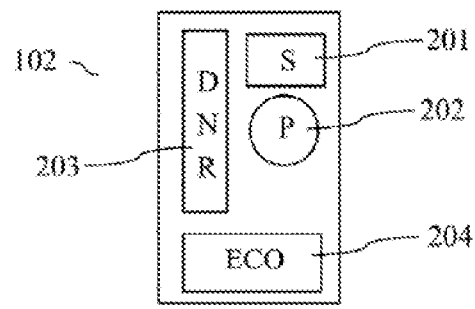
FIG. 2A shows a control element having different control segments.

FIG. 2A shows one exemplary control element 102 having different control segments 201, 202, 203, 204, which can be active or inactive depending on the state of the control element 102 or depending on the state of the vehicle 100. The different control segments 201, 202, 203, 204 can be provided e.g. as segments of a touch-sensitive screen. A control segment 201, 202, 203, 204 can be identified as active or inactive (e.g. a faded representation of a symbol can indicate that the corresponding control segment 201, 202, 203, 204 is inactive). Typically no input can be detected by way of an inactive control segment 201, 202, 203, 204.

The control element 102 illustrated in FIG. 2A comprises a start control segment 201, which enables a user to switch the vehicle 100 from a parked state to a ready-for-driving state. In addition, the control element 102 illustrated in FIG. 2A comprises a park control segment 202, which enables a user to switch the vehicle 100 from the ready-for-driving state to the parked state. Furthermore, the control element 102 can comprise a gear stage control segment 203, which can be used to set different gear stages (e.g. D, N or R) of a transmission 103. Moreover, the control element 102 can comprise a driving mode control segment 204, which can be used to select different driving modes (e.g. a sport mode, a comfort mode or an eco mode).

Figure 2B:
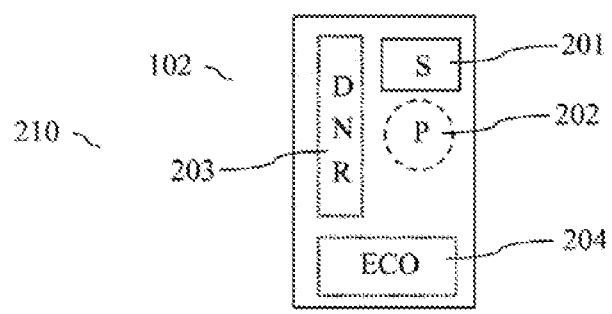
FIG. 2B shows the control element from FIG. 2A in a park state.

FIG. 2B shows the control element 102 from FIG. 2A in a park state 210 when the vehicle 100 is in a parked state and is not ready for driving. As illustrated by the dotted frames of the control segments 203, 204 in FIG. 2B, the gear stage control segment 203 and the optional driving mode control element 204 can be masked out and inactive. If appropriate, the park control segment 202 can also be masked out. On the other hand, in the park state 210, the park control segment 202 can be used to indicate the state of the parking brake 105 and/or of the transmission lock of the transmission 103 (this is represented by the dashed frame of the park control segment 202).

In the parked state of the vehicle 100 for example:
the parking brake 105 can be engaged;
the transmission lock 103 can be activated; and/or
the drive motor 104 can be deactivated and/or actuation electronics of the drive motor 104 can be deactivated.

As a result of the start control segment 201 being actuated, the vehicle 100 can be switched from the parked state to the ready-for-driving state. In the ready-for-driving state for example:
the transmission lock 103 can be deactivated; and/or
the drive motor 104 can be activated and/or actuation electronics of the drive motor 104 can be activated.

The parking brake 105 can still be engaged, if appropriate, in order to prevent the vehicle 100 from rolling away.

Figure 2C:
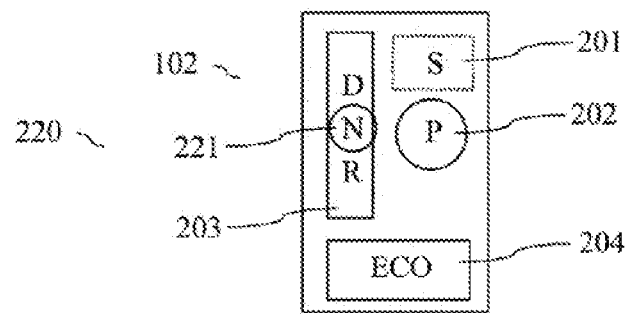
FIGS. 2C and 2D show the control element from FIG. 2A in a driving state.
Figure 2D:
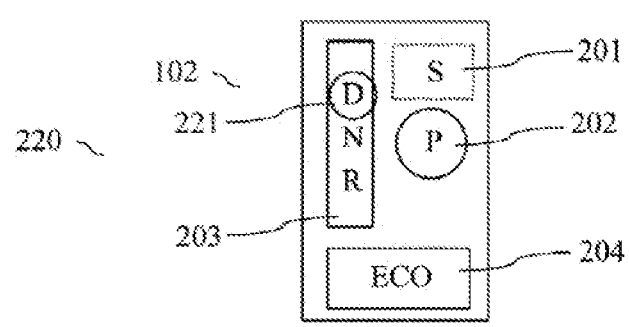

When the vehicle 100 is in the ready-for-driving state, the control element 102 can be switched to a driving state 220, in which control segments 202, 203, 204 are activated or deactivated. FIGS. 2C and 2D illustrate different variants of the control element 102 after the vehicle 100 has been switched to the ready-for-driving state. It is evident from FIGS. 2C and 2D that the start control element 201 has been deactivated (represented by the dotted frame) in the driving state 220 of the control element 102. On the other hand, the gear stage control element 203 and the park control element 202 and the optional driving mode control element 204 have been activated.

Upon switching from the parked state to the ready-for-driving state of the vehicle 100, the transmission 103 can automatically be switched to the gear stage 221 "N" (as illustrated in FIG. 2C) or to the gear stage 221 "D" (as illustrated in FIG. 2D) (e.g. solely by the actuation of the start control segment 201). As already set out above, release of the transmission lock can automatically be brought about. In this regard, the control convenience of a vehicle 100 can be increased. In particular, a manual change from a gear stage 221 "P" to the gear stage 221 "N" or "D" can thus be obviated.

The possibly still engaged parking brake 105 can be automatically released, if appropriate, when the vehicle 100 starts off (i.e. when an accelerator pedal of the vehicle 100 is actuated).

In order to switch the vehicle 100 from the ready-for-driving state to the parked state, the user of the vehicle 100 can actuate the park control segment 202. This can be done, if appropriate, proceeding from any arbitrary gear stage 221. In reaction to the actuation of the park control element 202, automatically:

the parking brake 105 can be engaged;
the transmission lock can be activated; and/or
the drive motor 104 can be deactivated and/or the actuation electronics of the drive motor 104 can be deactivated.

Actuating the park control segment 202 or instigating switching of the vehicle 100 from the ready-for-driving state to the parked state can be enabled, if appropriate, only if the vehicle 100 is at a standstill.

A control element 102 is thus described which distinguishes only between a parked state and a ready-for-driving state of the vehicle 100. In the driving state 220 of the control element 102, the control element 102 geometrically and/or visually enables a degree of freedom for selection of a gear stage 221 (forward, reverse or neutral). This degree of freedom is not available in the park state 210 of the control element 102.

Figure 3:
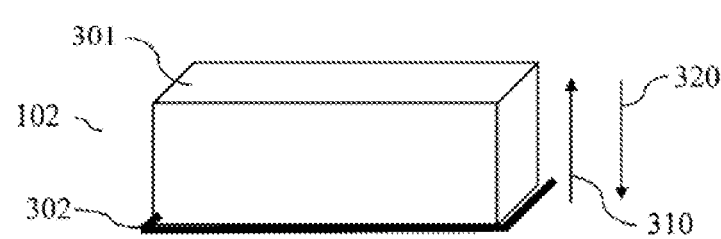
FIG. 3 shows an extendible control element.

As illustrated in FIG. 3, the control element 102 can be configured in extendible fashion. In particular, a control body 301 of the control element 102 can be extended out (represented by the arrow 310) from a surface 302 (e.g. from the surface 302 of a center console of the vehicle 100) when the control element 102 is switched from the park state 210 to the driving state 220. On the other hand, the control body 301 of the control element 102 can be retracted (e.g. to the same level as the surface 302) when the control element 102 is switched from the driving state 220 to the park state 210. The retraction of the control body 301 is illustrated by the arrow 320.

By way of example, pressing a start control segment 201 represented on the surface of the control body 301 can have the effect (e.g. by means of a correspondingly designed mechanism) that the control body 301 is extended. Furthermore, pressing a park control segment 202 represented on the surface of the control body 301 can have the effect that the control body 301 is retracted.

Figure 4A:
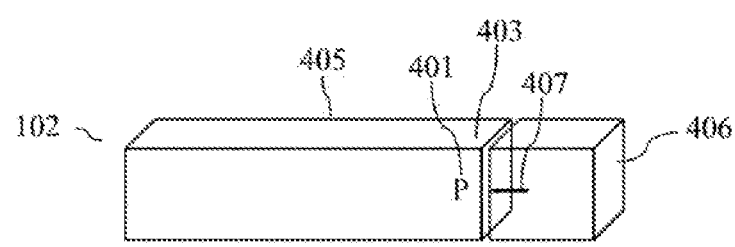
FIG. 4A shows a control element having a rotatably mounted control part.

FIG. 4A shows a control element 102 that can be provided e.g. as a lever on a steering wheel column of a vehicle 100 (in a manner similar to the lever for controlling a windshield wiper of a vehicle 100). The control element 102 comprises a base part 405, which is configured e.g. as a lever. Furthermore, the control element 102 comprises a control part 406, which can be rotated and/or displaced relative to the base part 405 in order to effect an input. The base part 405 can be configured as a parallelepiped, wherein the base part 405 has a park state area 401 and a driving state area 403.

Figure 4B:
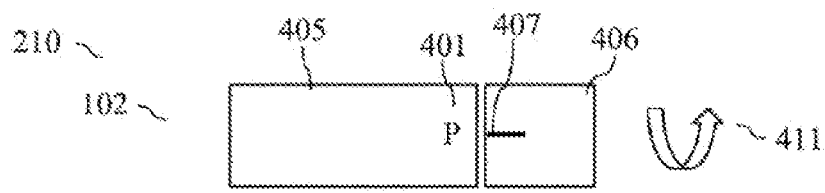
FIG. 4B shows the control element from FIG. 4A in a park state.
Figure 4C:
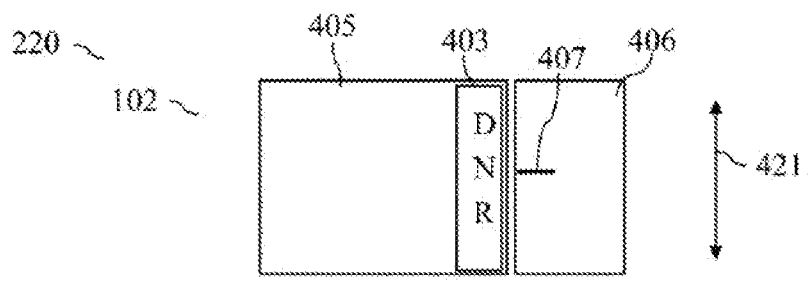
FIG. 4C shows the control element from FIG. 4A in a driving state.

FIG. 4B shows the control element 102 in the park state 210. The control part 406 can have a marking 407 indicating that the control part 406 is oriented toward the park state area 401. As a result of a rotation 411 of the control part 406, the control element 102 can be switched to the driving state 220 (see FIG. 4C), such that the marking 407 faces the driving state area 403. In the driving state 220, the control part 406 can then be laterally displaced 421 relative to the base part 405 in order to select different gear stages 221. By means of the control part 406 being rotated back, it is then possible for the control element 102 to be switched back again to the park state 210 in order to switch the vehicle from the ready-for-driving state to the parked state.

Figure 5:
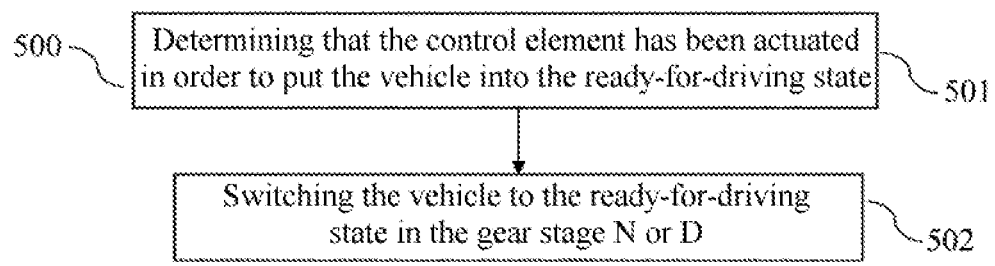
FIG. 5 shows a flow diagram of one exemplary method for switching a vehicle to a ready-for-driving state.

FIG. 5 shows a flow diagram of one exemplary method 500 for switching a vehicle 100 from a parked state to a ready-for-driving state by means of the control element 102 described in this document. The method 500 can be carried out e.g. by a control unit 101 of a vehicle 100 and/or of a control element 102. The method 500 comprises determining 501 that the control element 102 has been actuated in order to switch the vehicle 100 from the parking or parked state to the ready-for-driving state. In this case, a single actuation of the control element 102 (a single actuation of the start control segment 201 and/or a single rotation 411 of the control part 406 from the park state area 401 to the driving state area 403) can be sufficient to instigate the switching from the parked state to the ready-for-driving state.

In addition, the method 500 comprises, directly in reaction to the determining 501, actuating 502 the transmission 103 of the vehicle 100 in order to release the transmission lock 103 of the transmission 103. In this case, the transmission 103 can be switched directly to the gear stage 221 N or D. In other words, the vehicle 100 can be switched to the ready-for-driving state directly in the gear stage 221 N or D without a further input by the user.

Figure 6A:
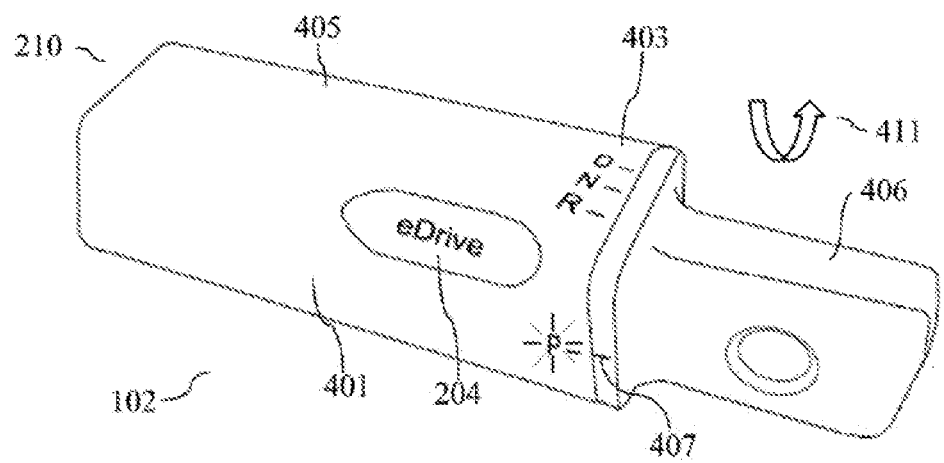
FIGS. 6A to 6D show different states of one exemplary control element.
Figure 6B:
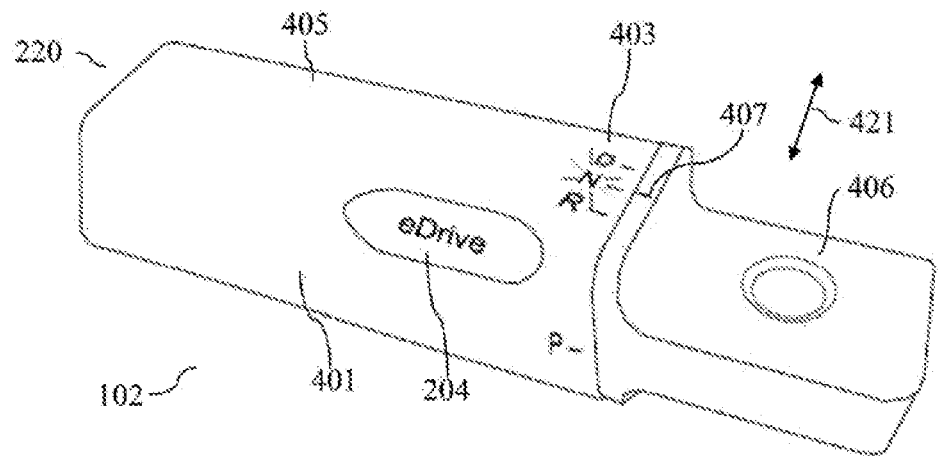
Figure 6C:
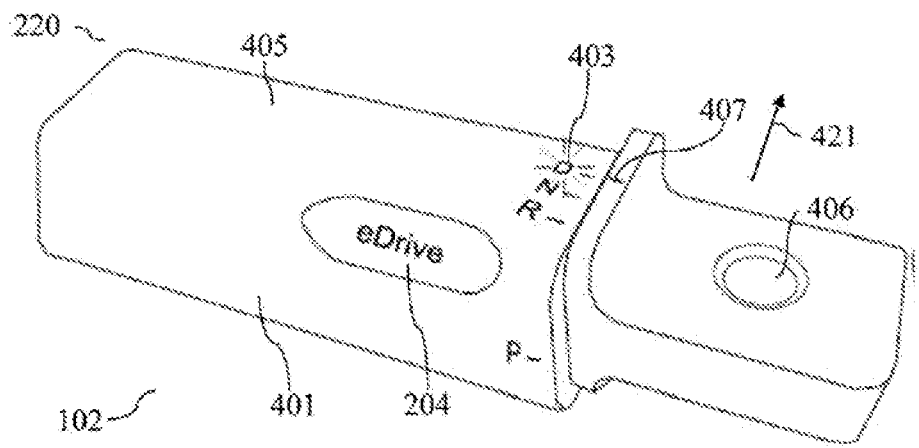
Figure 6D:
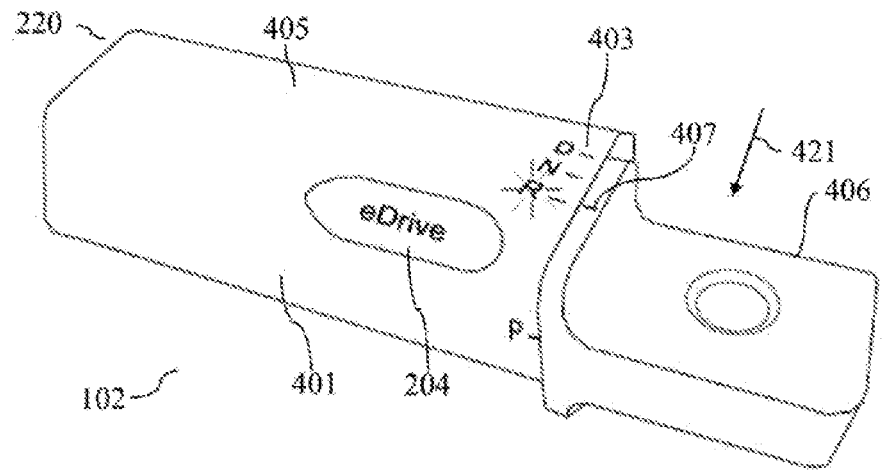

FIGS. 6A to 6D, 7A to 7D and 8A to 8D show different states of different exemplary control elements 102 in a perspective illustration. FIGS. 6A to 6D show different states of the control element 102 described in association with FIGS. 4A to 4C. FIG. 6A shows the control element 102 in the park state 210. The marking 407 of the control part 406 faces the park state area 401. As a result of rotating 411 the control part 406, the marking 407 can face the driving state area 403 of the base part 405 (see FIGS. 6B to 6D). After rotating 411 the control part 406, it is possible firstly for the gear stage 221 N to be set (as illustrated in FIG. 6B). The control element 102 in the driving state 220 enables a translational movement 421 of the control part 406 in order to set the gear stage 221 D (see FIG. 6C) or the gear stage 221 R (see FIG. 6D). By means of a rotational movement 411 of the control part 406, the control element 102 can be switched to the park state 210 again. Typically no translational movement 421 of the control part 406 is possible in the park state 210.

FIGS. 7A to 7D show different states of a control element 102 comprising aspects from FIGS. 2A to 2D and from FIG. 3. In particular, the control element 102 comprises a control body 301, which can be in a retracted state (see FIGS. 7A and 7B) or in an extended state (see FIGS. 7C and 7D). In particular, the control body 301 can be extended out from a frame on a surface 302 of the vehicle 100 (e.g. on the center console).

A surface of the control body 301 that is visible to a user of the control element 102 even in the retracted state of the control body 301 can be configured to represent one or more symbols. In particular the surface of the control body 301 can comprise an (if appropriate touch-sensitive) screen. Alternatively or supplementarily, graphical elements (in particular for display) can be provided, which are or are not illuminated depending on the state of the control element 102.

Figure 7A:
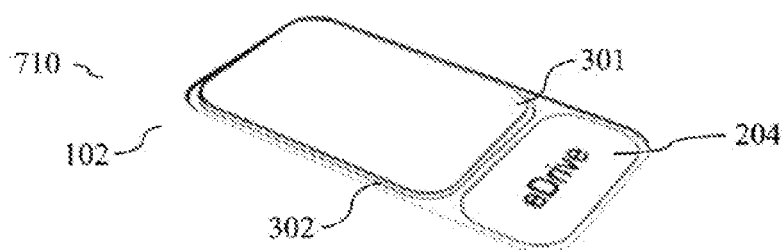
FIGS. 7A to 7D show different states of a further exemplary control element.

FIG. 7A shows the control element 102 in a rest state 710. The rest state 710 can be present e.g. if there is no user in the vehicle and/or if a central locking system of the vehicle 100 is active. By way of example, the control unit 101 can be configured to detect whether a driver is situated at a driver's position in the vehicle 100. If this is the case, then the control element 102 can be switched from the rest state 710 to the park state 210. On the other hand, the control element 102 can be kept in the rest state 710. In the rest state 710, it is possible, if appropriate, for no control segment 201, in particular no start control segment 201, to be provided on the control element 102 (e.g. in order to reduce the energy consumption of the control element 102). The control element 102 can thus be configured to enable no inputs at all in the rest state 710.

Figure 7B:
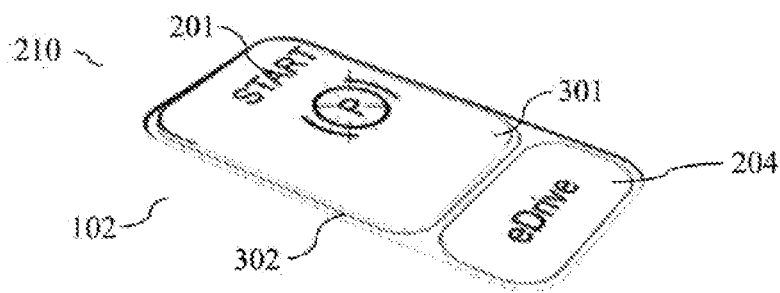

FIG. 7B shows the control element 102 in the park state 210. The control element 102 comprises a start control segment 201, which can be actuated by a user in order to switch the vehicle 100 from the parked state to the ready-for-driving state. Moreover, if appropriate, the state of the parking brake 105 and/or of a transmission lock of a transmission 103 of the vehicle 100 can be indicated.

By means of pressing on the surface of the control body 301, it is possible e.g. for a button to be actuated by the control body 301. In reaction thereto, the vehicle can then be switched from the parked state to the ready-for-driving state. Furthermore, the control body 301 can be moved (e.g. by means of a spring) into the extended state.

Figure 7C:
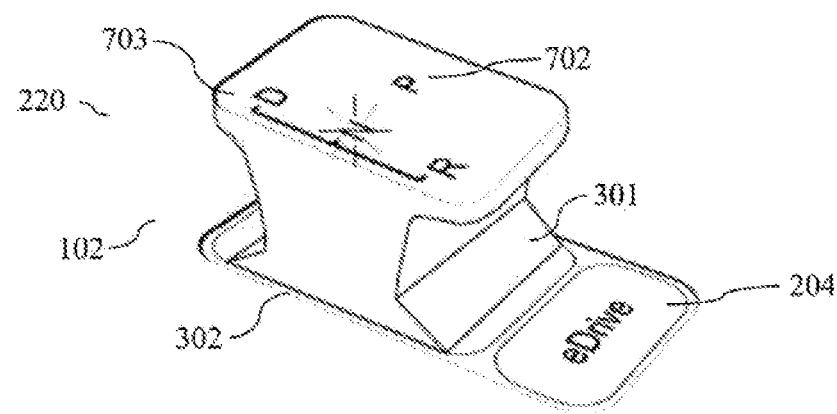
Figure 7D:
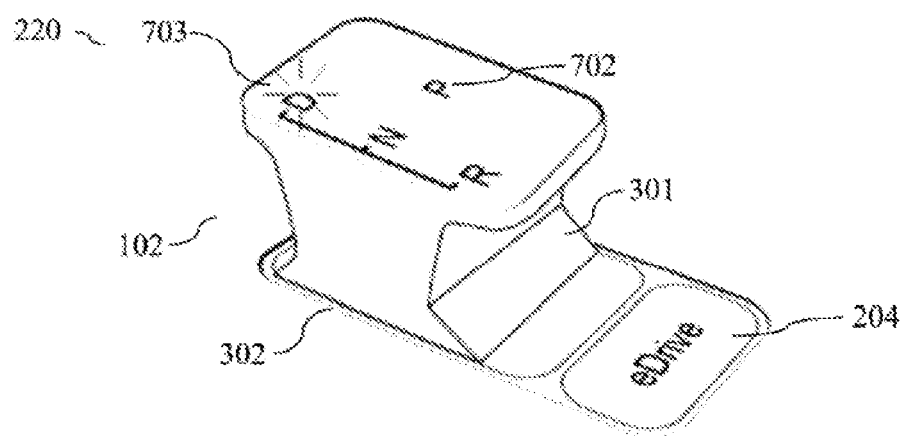
Figure 8A:
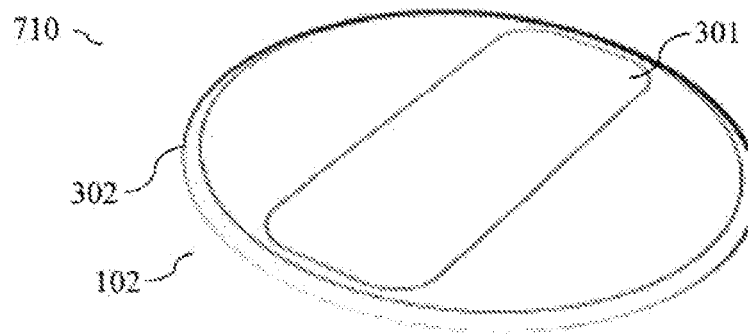
FIGS. 8A to 8D show different states of a further exemplary control element.
Figure 8B:
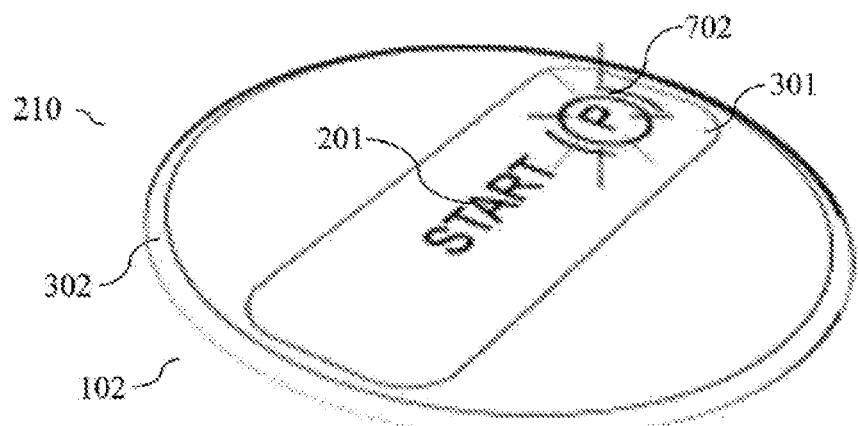
Figure 8C:
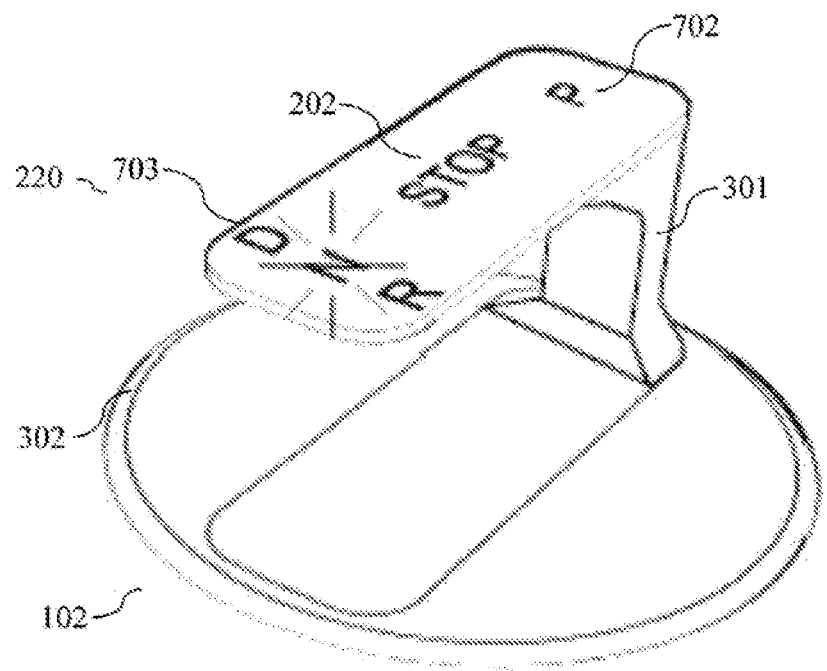
Figure 8D:
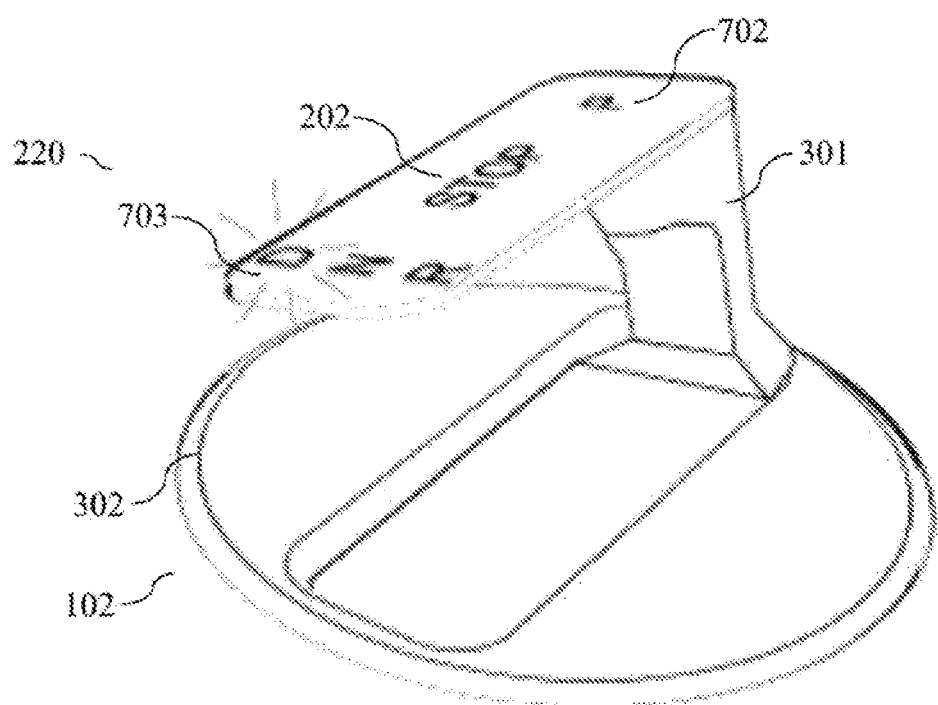

FIGS. 7C and 7D show the control element 102 in the driving state 220. The control body 301 can be extended out for the purpose of switching to the driving state 220. A gear stage display element 703 can then be provided on the surface of the control body 301, said display element displaying the currently set gear stage 221 (and, if appropriate, the available gear stages 221). The gear stage 221 of the vehicle 100 can be altered by means of a (translational) movement of the control body 301.

The control element 102 can be configured in such a way that the control body 301 can be pressed from the extended state into the retracted state by a user (e.g. in order to overcome the spring force of a spring for extending out the control body 301). As a result, the control element 102 can be switched from the driving state 220 to the park state 210. Furthermore, this can cause the vehicle 100 to be switched from the ready-for-driving state to the parked state. Pressing back the control body 301 can thus correspond to an input for switching the vehicle 100 from the ready-for-driving state to the parked state.

Furthermore, the control element 102 in the example illustrated in FIGS. 7C and 7D comprises an optional park interface element 702. The park interface element 702 can be configured to display the state of the parking brake 105 (i.e. released or engaged) and/or the state of the transmission lock of the transmission 103 (i.e. active or inactive) of the vehicle 100. In particular, a combined display can be provided, displaying both the state of the parking brake 105 and the state of the transmission lock. Furthermore, separate park interface elements 702, 702' (cf. FIG. 9C) can be provided, which display the state of the parking brake 105 and the state of the transmission lock separately from one another.

Furthermore, the park interface element 702 can enable a user (e.g. by touching the park interface element 702) to alter the state of the parking brake 105 and/or the state of the transmission lock. By way of example, by actuating the park interface element 702, it is possible for the parking brake 105 to be engaged or released. Alternatively or supplementarily, by actuating the park interface element 702, it is possible for the transmission lock to be activated or deactivated. By way of example, by actuating the park interface element 702, it is possible for the respective other state of the parking brake 105 and/or of the transmission lock to be brought about.

As already set out above, the vehicle 100 can comprise one or more environment sensors for providing environment data. The environment data can comprise information in relation to the gradient and/or the coefficient of friction of the roadway on which the vehicle 100 is situated. In reaction to actuating the park interface element 702, depending on the environment data, it is possible for either only the parking brake 105, either only the transmission lock or both the parking brake 105 and the transmission lock to be actuated (in order to alter the respective state).

FIGS. 8A to 8D show different states of a control element 102 having an extendible control body 301. In this case, in the extended state, the control body 301 enables a rotational movement in order to set the different gear stages 221. By way of example, the setting of the gear stage D (see FIG. 8D) can be brought about by means of a rotational movement forward and the setting of the gear stage N can be brought about by means of a rotational movement backward.

The control element 102 from FIGS. 8A to 8D comprises a start control segment 201, which can be touched by a user in order to switch the vehicle 100 from the parked state to the ready-for-driving state. In reaction to the touching of the start control segment 201, the control body 301 can be switched automatically (e.g. by means of an electric drive) from the retracted state into the extended state. This can be done as part of the switching of the control element 102 from the park state 210 to the driving state 220.

In the driving state 220, a park control segment 202 can then be provided on the surface of the control body 301 (e.g. at the same location as the start control segment 201). Touching the park control segment 202 can have the effect that the control body 301 is switched (if appropriate automatically) from the extended state into the retracted state.

Figure 9A:
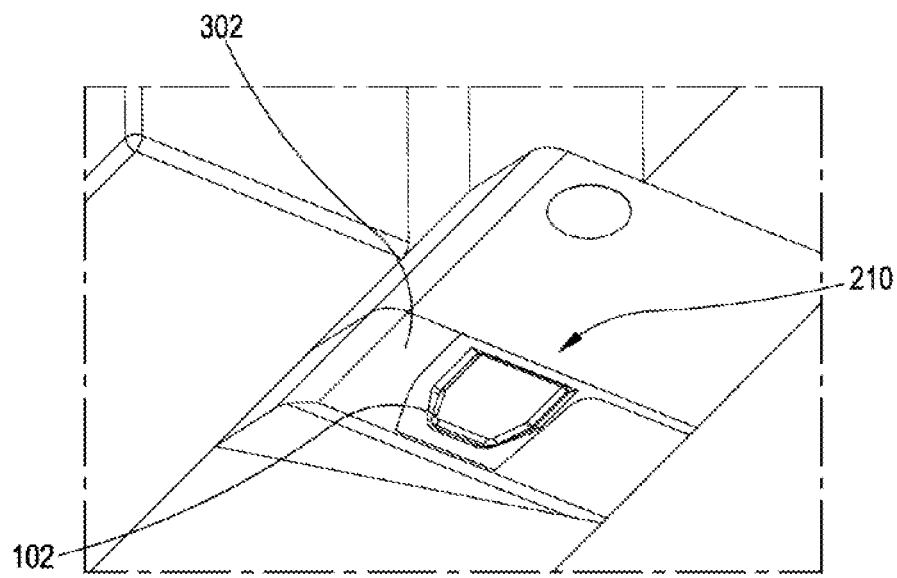
FIGS. 9A to 9G show different states of a further exemplary control element.
Figure 9B:
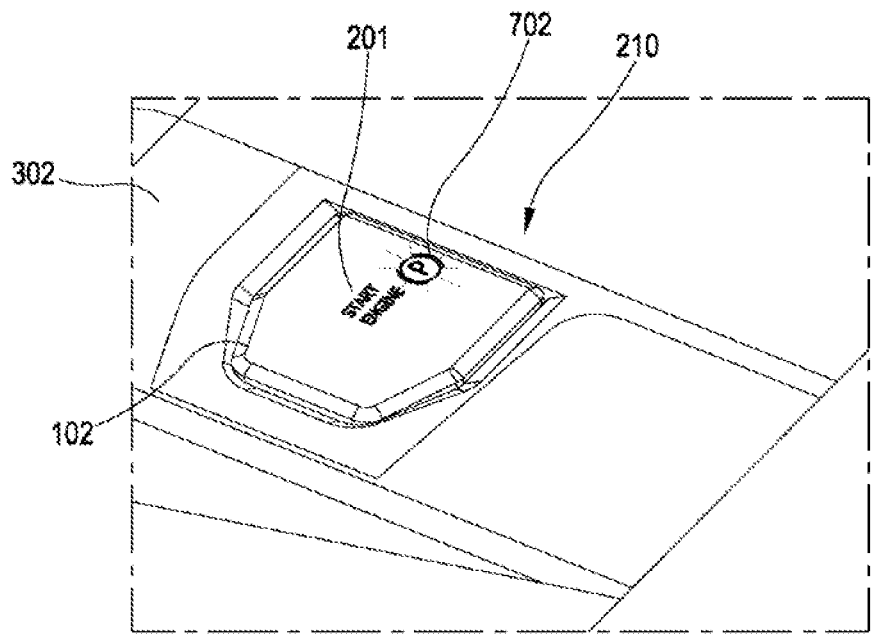

FIGS. 9A to 9G show different states of a control element 102 having an extendible control body 301. FIGS. 9A and 9B show the control body 301 in the retracted state, and FIGS. 9C to 9G show the control body in the extended state, or in a state of actuation e.g. by a driver (cf. FIGS. 9D, 9F).

In the extended state, the control body 301 enables a rotational or tilt movement in order to set the different gear stages 221. By way of example, it is possible (proceeding from N or R) to bring about the setting of the gear stage D or respectively N (see FIG. 9D) by means of a rotational or tilt movement forward (i.e. in the direction of travel) and (proceeding from D or N) to bring about the setting of the gear stage N or respectively R by means of a rotational or tilt movement backward (i.e. counter to the direction of travel).

The control body 301 can furthermore be arranged in movable fashion such that the control body 301 is moved (e.g. rotated or tilted) into one or more latching positions, haptically detectable by a user. An intended change of the gear stage can then be effected depending on the latching position chosen by a user. By way of example, proceeding from the gear stage D a first selected latching position of the control body 301 can bring about a change of the selected gear stage to N and a second selected latching position of the control body 301 can bring about a change of the selected gear stage to R.

In this case, the first and second latching positions can differ on the basis of a different rotational or tilt angle, such that the second latching position is attained at a greater rotational or tilt angle than the first latching position. Analogously, proceeding from the gear stage R, a first selected latching position of the control body 301 can bring about a change of the selected gear stage to N and a second selected latching position of the control body 301 can bring about a change of the selected gear stage to D. Furthermore, the available latching positions can be limited on the basis of a selected gear stage, such that in the case of the engaged gear stage N, for example, only one latching position is available in each of the two rotational or tilt directions, the actuation of which then brings about respectively a change to D or R.

The latching positions described above can be correspondingly provided in all of the embodiments described, in particular also in conjunction with translational movement of the control body 301.

The control element 102 from FIGS. 9A to 9G comprises a start control segment 201, which can be actuated by a user in order to switch the vehicle 100 from the parked state to the ready-for-driving state. In reaction to actuating the start control segment 201, it is possible for the control body 301 to be switched automatically (e.g. by means of an electric drive) from the retracted state into the extended state. This can be done as part of the switching of the control element 102 from the park state 210 to the driving state 220.

In the driving state 220, a park control segment 202 can then be provided on the surface of the control body 301 (e.g. at the same location as the start control segment 201). Actuating the park control segment 202 can have the effect that the control body 301 is switched (if appropriate automatically) from the extended state into the retracted state.

Furthermore, the control element 102 in the example illustrated in FIGS. 9B to 9G can comprise an optional park interface element 702. The park interface element 702 can be configured to display the state of the parking brake 105 (i.e. released or engaged) and/or the state of the transmission lock of the transmission 103 (i.e. active or inactive) of the vehicle 100. In particular, a combined display can be provided, displaying both the state of the parking brake 105 and the state of the transmission lock. FIG. 9B illustrates one exemplary display of an activated park interface element 702, signaling an engaged parking brake. FIGS. 9C to 9G illustrate by way of example a display signaling that the parking brake has been released.

Figure 9C:
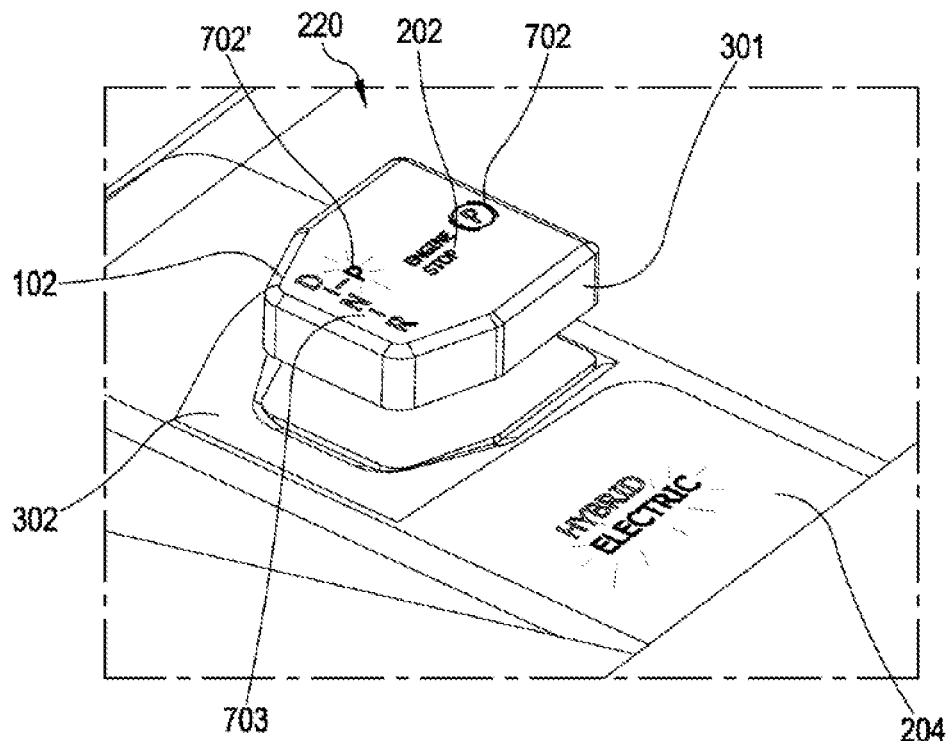
Figure 9D:
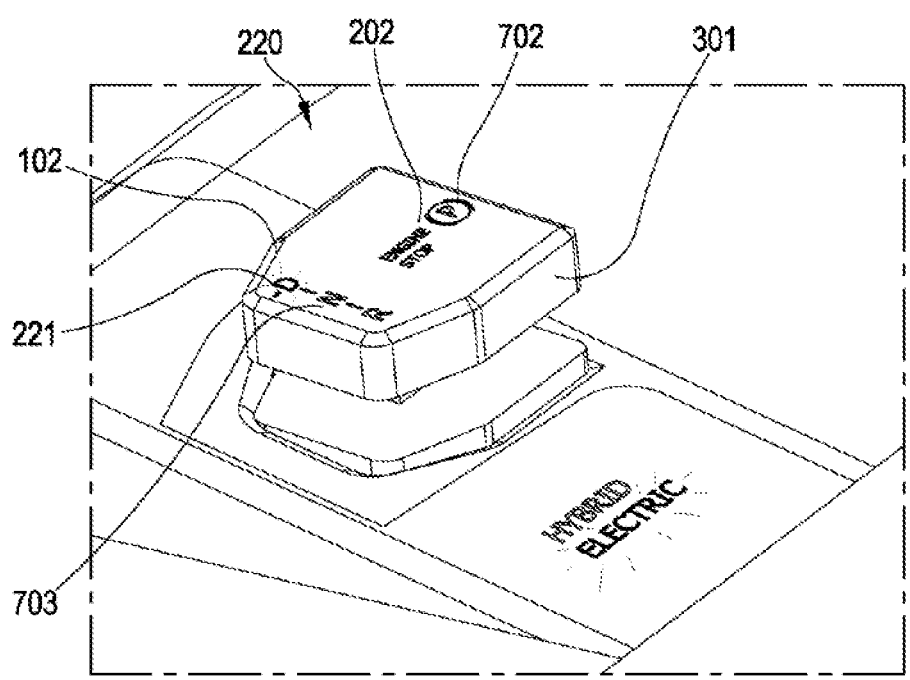

Furthermore, a separate display can be provided, displaying the state of the parking brake 105 in element 702 and the state of the transmission lock P in a separate element 702'. FIG. 9C illustrates separate elements 702 and 702', wherein an activated (e.g. luminous) element 702' signals an engaged transmission lock P.

The park interface element 702 illustrated in FIGS. 9C to 9G can additionally be actuated in the driving state 220 in order to brake the vehicle 100 or bring it to a standstill by way of the parking brake 105 in exceptional or emergency situations. This can also be done by a passenger by actuating the park interface element 702, for example if the driver is unable to do that. In the case where a combined display is provided, displaying both the state of the parking brake 105 and the state of the transmission lock, in such exceptional or emergency situations, an actuation of the park interface element 702 can firstly bring about the activation of the parking brake 105 for braking the vehicle 100 and, once the vehicle 100 has come to a standstill, an activation of the transmission lock.

Figure 9E:
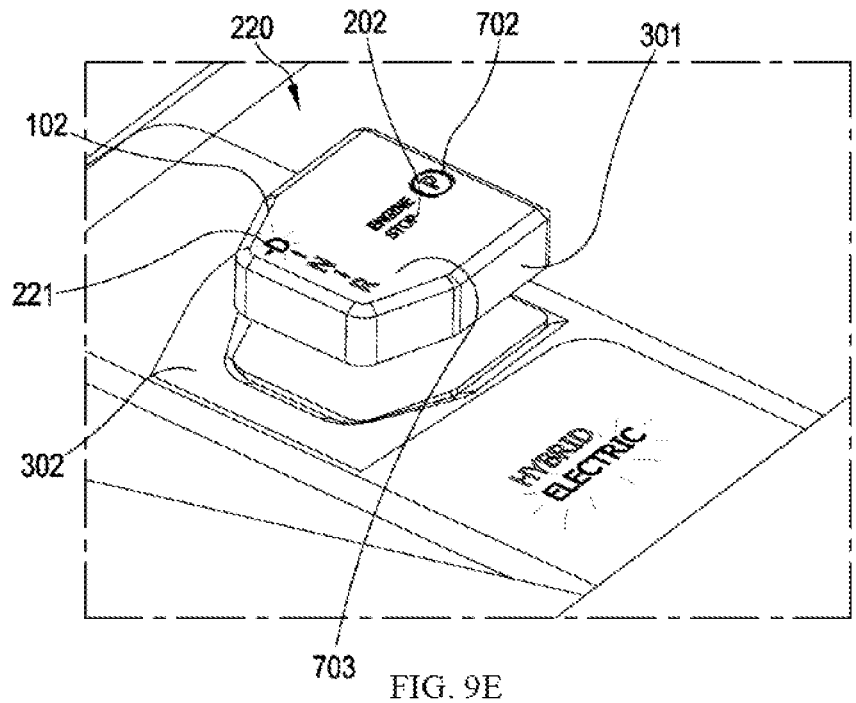
Figure 9F:
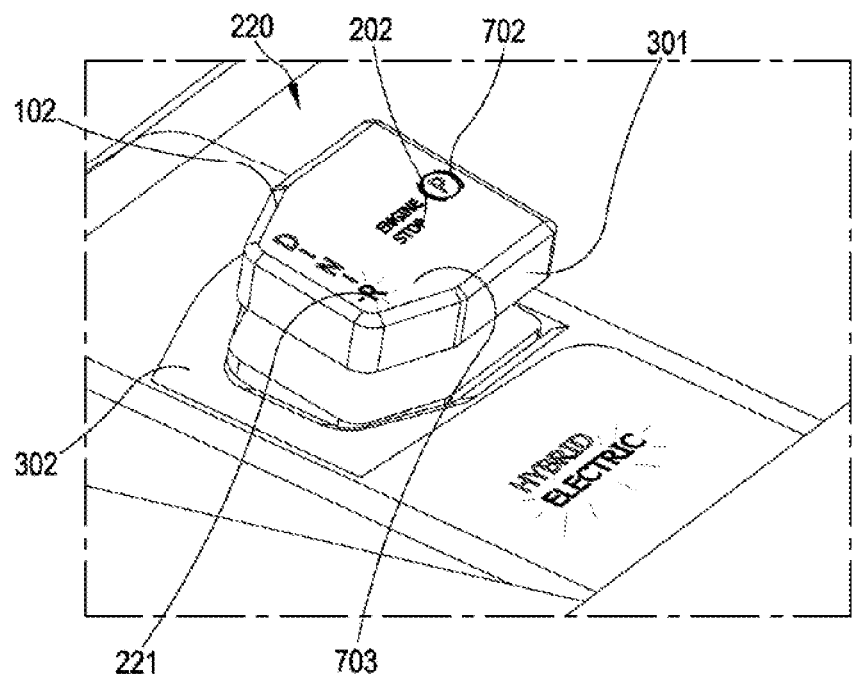
Figure 9G:
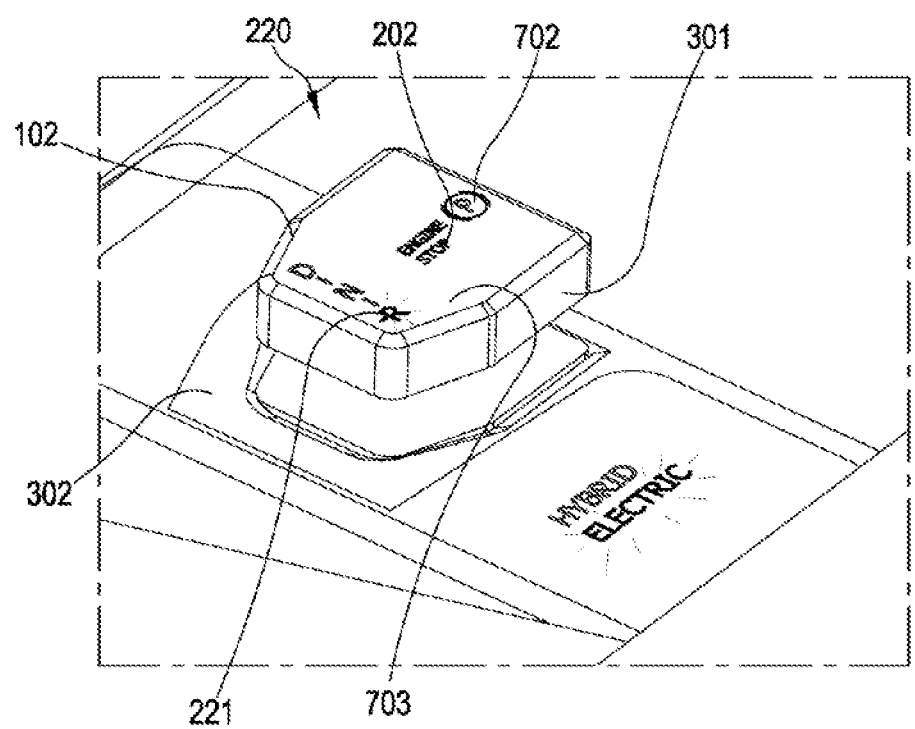
Figure 10:
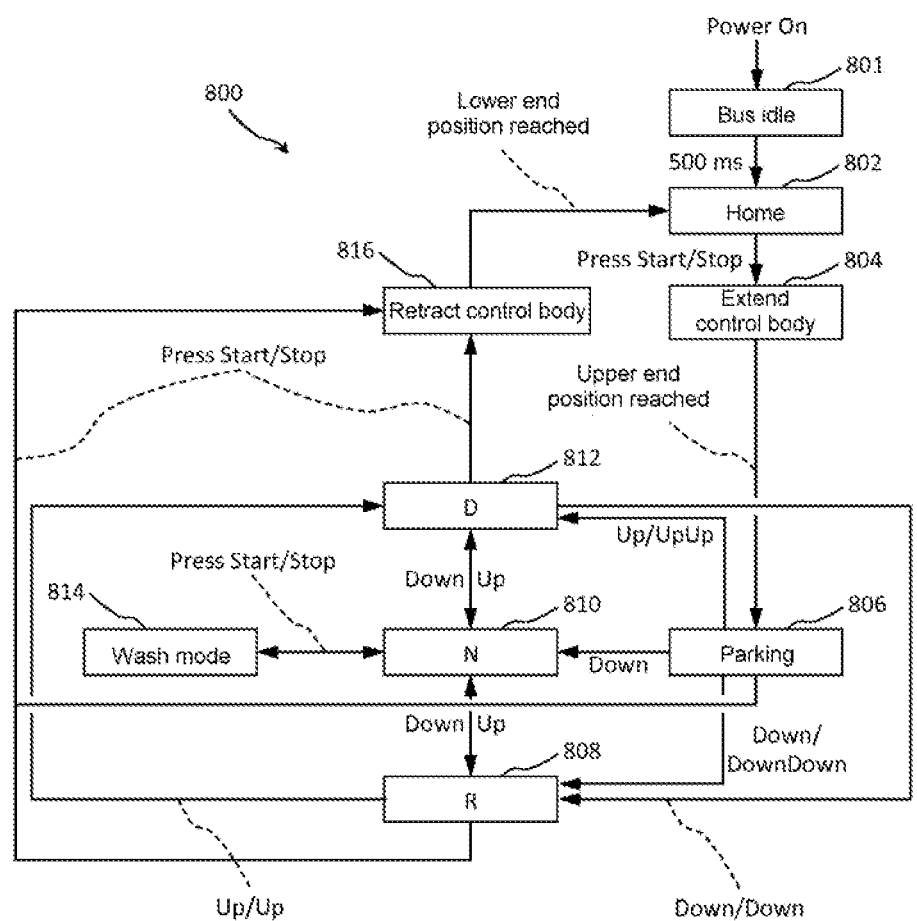
FIG. 10 shows an exemplary state diagram in accordance with various embodiments of the control element.

FIG. 10 shows an exemplary state diagram 800 in accordance with various embodiments of the control element, illustrating various states and state transitions by way of example. The state diagram is oriented toward the control element 102 described by way of example with reference to FIGS. 9A to 9G, but is applicable to other embodiments (cf. for example FIGS. 7A to 7D with translational movements). The display and control functions described below for the individual states should be understood to be by way of example. In various embodiments, different or modified display and control functions can be realized.

The display states described below as "search illumination" and "functional illumination" should be understood to be optically differently perceptible in order to be able to display states or functions. Where reference is made to "START/STOP" hereinafter, this is taken to mean "START ENGINE" and "ENGINE STOP", respectively, as illustrated for example in FIGS. 9B and 9C. It is thereby possible to describe a transition between two states independently of the direction (e.g. from state 814 to state 816 and vice versa).

After the start-up of the system (Power On), the state 801 is attained. In the state 801, the control element 102 (or the control body 301) is in the retracted state and the display elements are switched off (cf. FIG. 9A, no display). After a predetermined time (e.g. 500 ms), the state 802 is attained. In state 802, "START ENGINE" pulsates in search illumination, signaling a possible actuation to the user. Furthermore, the park luminaire is displayed in functional illumination.

After the actuation of "START ENGINE" the state 804 is attained. In state 804, the control element 102 or the control body 301 is extended. In state 804, "START ENGINE" is displayed in search illumination and the park luminaire is displayed in functional illumination. As soon as the control element 102 or the control body 301 has reached the upper end position, state 806 is attained.

In state 806, P is represented in functional illumination. Furthermore, D, N, and R, "ENGINE STOP" and the park luminaire are represented in search illumination. By way of a movement of the control element 102 or of the control body 301 (cf. FIG. 10), the user can change to one of the states 808, 810 and 812. In this case, the control element 102 or the control body 301 can be moved either into a first latching position (e.g. "Down" or "Up") or via the first latching position into a second latching position (e.g. "DownDown" or "UpUp") (cf. FIGS. 9D, 9F) before it then reverts automatically again into the central position (cf.

FIGS. 9E, 9G). Furthermore, actuation of "ENGINE STOP" makes it possible to change to the state 816.

In state 808, R is represented in functional illumination. Furthermore, D, N, "ENGINE STOP" and the park luminaire are represented in search illumination. The vehicle can be moved in driving operation in reverse in the state 808.

In state 810, N is represented in functional illumination. Furthermore, D, R, "ENGINE STOP" and the park luminaire are represented in search illumination. In the state 810, the vehicle is in neutral with the engine being switched on or running. By way of a movement of the control element 102 or the control body 301, the user can change to one of the states 808 or 812, as described above (cf. state 806). By means of the actuation of "START/STOP", it is possible to change back and forth between state 810 and state 814 (e.g. by means of the actuation of "START ENGINE" or "ENGINE STOP", depending on the current state). In state 814, N is represented in functional illumination. Furthermore, D, R, "START ENGINE" and the park luminaire are represented in search illumination. In the state 814, the vehicle is in neutral, with the engine being switched off. State 814 serves for example to keep the vehicle ready without parking brake or transmission lock and without the engine switched on or running (e.g. in a carwash).

In state 812, D is represented in functional illumination. Furthermore, N, R, "ENGINE STOP" and the park luminaire are represented in search illumination. In the state 812, the vehicle can be moved in driving operation forward.

In state 816, "START ENGINE" pulsates in search illumination and the control element 102 or control body 301 is retracted. As soon as the control element 102 or the control body 301 has reached the lower end position, the state 802 is attained.

The measures described in this document make it possible to reduce the number of control steps when starting a vehicle 100 or when parking a vehicle 100. In this regard, the convenience for the user of a vehicle 100 can be increased. Furthermore, costs in a vehicle 100 can thus be reduced.

The present invention is not restricted to the exemplary embodiments shown. In particular, it should be noted that the description and the figures are intended merely to illustrate the principle of the proposed methods, devices and systems.

LIST OF REFERENCE SIGNS 100 vehicle
101 control unit
102 control element
103 transmission
104 drive motor
105 transmission
201 start control segment
202 park control segment
203 gear stage control segment
204 driving mode control segment
210 park state
220 driving state
221 selected gear stage
301 control body
302 surface
310, 320 arrows (movement direction)
401 park state area
403 driving state area
405 base part
406 control part
407 marking
411 rotation
421 translational movement
500 method for switching a vehicle from a park state to a ready-for-driving state
501, 502 method steps
702, 702' park interface element
703 gear stage display element
710 rest state The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a vehicle, comprising:
a control element configured to change between a park state and a driving state, wherein
the control element in the park state is configured to enable a user to switch the vehicle from a parked state to a ready-for-driving state;
the control element, as a result of a change from the park state to the driving state, enables a possibility for a selection of a gear stage of the vehicle by the user of the vehicle,
the control element comprises a control part, which is movable relative to a base part of the control element;
the base comprises a park state area and a driving state area;
the control part is configured to be rotated on an axis from the park state area to the driving state area by the user in order to switch the vehicle from the parked state to ready-for-driving state; and
the control part is configured to be laterally displaced non-parallel to the axis by the user in order to change the gear state of the vehicle.

2. The control system according to claim 1, wherein the control element is configured, in the park state and in the driving state, to enable at least partly different inputs for controlling a transmission, a parking brake and/or a drive motor of the vehicle.

3. The control system according to claim 1, wherein the control element in the park state:
is exclusively configured to detect an input for switching the vehicle from the parked state to the ready-for-driving state;
enables no input regarding a change of the gear stage of the vehicle; and/or
enables no input which is directed solely to releasing a transmission lock of a transmission of the vehicle.

4. The control system according to claim 3, wherein the control element in the driving state:
is configured to detect an input for switching the vehicle from the ready-for-driving state to the parked state;
enables no input which is directed exclusively to activating the transmission lock of the transmission; and/or
enables no input which is directed exclusively to stopping a drive motor of the vehicle.

5. The control system according to claim 1, wherein the control element in the driving state:
is configured to detect an input for switching the vehicle from the ready-for-driving state to the parked state;
enables no input which is directed exclusively to activating a transmission lock of the transmission; and/or enables no input which is directed exclusively to stopping a drive motor of the vehicle.

6. The control system according to claim 1, wherein the control element comprises a touch-sensitive screen.

7. The control system according to claim 1, wherein the control part is configured to be rotated from the driving state area to the park state area by the user proceeding from an arbitrary gear stage of the vehicle, in order to switch the vehicle from the ready-for-driving state to the parked state.

8. The control system according to claim 1, wherein the control element comprises a control unit configured to generate a control signal for a drive motor, for actuation electronics of the drive motor, for a transmission and/or for a parking brake of the vehicle depending on an input by the user at the control element.

9. The control system according to claim 8, wherein a transmission lock of the transmission is closed in the parked state of the vehicle; and the control unit is configured to generate a control signal for opening the transmission lock of the transmission in reaction to a user input at the control element which is designed to switch the vehicle from the parked state to the ready-for-driving state.

10. The control system according to claim 9, wherein the control unit is configured to switch the control element from the parked state to the driving state as soon as the vehicle has been switched from the parked state to the ready-for-driving state.

11. The control system according to claim 1, wherein in the parked state, a transmission lock of a transmission of the vehicle is closed, a parking brake of the vehicle is engaged and a drive motor and/or actuation electronics of the drive motor are/is inactive; and in the ready-for-driving state, the transmission lock of the transmission of the vehicle is open and the drive motor and/or the actuation electronics of the drive motor are/is active.

12. The control system according to claim 1, wherein the control element is secured against unintentional actuation.

13. A vehicle, comprising:
a drive motor for driving one or more wheels of the vehicle;
a transmission configured to vary a coupling between the drive motor and the one or more wheels; and
a control system according to claim 1.

* * * * *